(12) United States Patent
Malboeuf Joset et al.

(10) Patent No.: US 9,232,578 B2
(45) Date of Patent: Jan. 5, 2016

(54) LED LAMP WITH VARIABLE INPUT POWER SUPPLY

(75) Inventors: Mathieu Ludovic Malboeuf Joset, Coteau-du-Lac (CA); Dorian Braun, Pointe-Claire (CA); Andrew D. Piaskowski, Saint-Colomban (CA)

(73) Assignee: BRAMAL LED INC., Quebec (CA)

( * ) Notice: Subject to any disclaimer, the term of this patent is extended or adjusted under 35 U.S.C. 154(b) by 224 days.

(21) Appl. No.: 13/989,276

(22) PCT Filed: Nov. 23, 2011

(86) PCT No.: PCT/CA2011/050728
§ 371 (c)(1),
(2), (4) Date: Sep. 12, 2013

(87) PCT Pub. No.: WO2012/068687
PCT Pub. Date: May 31, 2012

(65) Prior Publication Data
US 2013/0342119 A1 Dec. 26, 2013

Related U.S. Application Data

(60) Provisional application No. 61/416,327, filed on Nov. 23, 2010.

(51) Int. Cl.
*H05B 33/08* (2006.01)
*F21K 99/00* (2010.01)
*F21Y 101/02* (2006.01)
*F21Y 103/00* (2006.01)

(52) U.S. Cl.
CPC ............ *H05B 33/0815* (2013.01); *F21K 9/17* (2013.01); *H05B 33/0809* (2013.01); *F21Y 2101/02* (2013.01); *F21Y 2103/003* (2013.01)

(58) Field of Classification Search
CPC .......... H05B 33/0815; H05B 33/0809; H05B 33/0887; H05B 33/0824; H05B 37/02; H04N 1/047; H04N 1/12; H04N 1/128; H04N 1/1911
USPC .......................... 315/186, 191, 193, 307, 308
See application file for complete search history.

(56) References Cited

U.S. PATENT DOCUMENTS

| 7,609,008 | B1 | 10/2009 | Kohler |
| 2004/0012959 | A1 | 1/2004 | Robertson |
| 2009/0091929 | A1 | 4/2009 | Faubion |
| 2010/0033095 | A1 | 2/2010 | Sadwick |

*Primary Examiner* — John Poos
(74) *Attorney, Agent, or Firm* — Norton Rose Fulbright Canada LLP; Alexandre Daoust

(57) ABSTRACT

There is provided a light emitting diode apparatus for operation with varying input electrical sources. The apparatus comprises an array of light emitting diodes to produce light, and a variable input power supply adapted to provide an electrical supply of predetermined value to the light emitting diodes from a varying electric signal provided by varying input electrical sources. In one embodiment, the light emitting diode apparatus is for use as a replacement of a fluorescent tube in an existing fluorescent fixture. In another embodiment, the light emitting diode apparatus is for use with connection to conventional AC voltage sources used throughout the world.

12 Claims, 2 Drawing Sheets

LED LAMP WITH VARIABLE INPUT POWER SUPPLY

CROSS-REFERENCE TO RELATED APPLICATION(S)

The present application claims priority on U.S. Provisional Patent Application No. 61/416,327, filed on Nov. 23, 2010, and incorporated herein by reference.

FIELD OF THE APPLICATION

The invention relates to Light Emitting Diode (LED) lamps and, more specifically, to a power supply thereof.

BACKGROUND OF THE ART

A fluorescent lamp is a gas-discharge lamp that uses electricity to excite mercury vapor or other rare earth gases included in a fluorescent tube. The excited atoms produce shortwave ultraviolet light or shortwave radiation that then causes a phosphor to fluoresce, producing visible light. A fluorescent lamp converts electrical power into useful light more efficiently than an incandescent lamp. Lower energy cost typically offsets the higher initial cost of the lamp. Fluorescent lamp fixtures are more costly, in part, because they must include a ballast used to power the fluorescent lamp so as to regulate the flow of current through the anode and cathode of the fluorescent lamp.

While large fluorescent lamps have been mostly used in commercial or institutional buildings, Compact Fluorescent Lamps (CFLs), or Compact Fluorescent Tubes (CFTs), are now also available in the same popular sizes as incandescent lamps and are used as an energy-saving alternative in homes. Compared to general service incandescent lamps or High-Intensity Discharge (HID) lamps, CFLs use less power for a similar light intensity and have a longer rated life. Like all fluorescent lamps, CFLs contain mercury, or non ROHS (Removal Of Hazardous Substances) compliant materials which complicates their disposal. CFLs also radiate a different light spectrum from that of incandescent lamps. Improved phosphor formulations have improved the subjective color of the light emitted by CFLs such that some sources rate the best "soft white" CFLs as subjectively similar in color to standard incandescent lamps or HID lamps.

Recently, the application of Light Emitting Diodes (LEDs) in residential, commercial, industrial and institutional illumination has become more and more popular. Compared to common fluorescent or HID lamps, for example, LEDs are more durable in nature, consume less power, have longer lamp life, emit generous amounts of light, produce less heat, offer a wider range of light colors and are environmentally friendly.

One drawback, however, is that existing LEDs are not capable of operating with variable inputs such as varying frequency, current, voltage and magnetic fields. For example, the ballasts used in fluorescent lamp fixtures to power fluorescent lamps have variable outputs. The output of fluorescent lamp ballasts varies widely in voltage, frequency, and current, dependant on the make and model. LEDs operate at a precise voltage and precise current flow. Any electrical energy source will require conditioning to establish the correct DC voltage for the LED array. A power supply which can receive a wide range of voltage, frequency and electrical waveforms and convert this to a precise output voltage, is required to operate LEDs correctly.

In order to provide a LED-based replacement to traditional fluorescent lamps in common fluorescent lamp fixtures, the limited operation of existing LEDs with respect to their power supplies requires that existing fluorescent lamp fixtures be retrofitted. Retrofitting a fluorescent lamp fixture with existing LEDs entails the removal of the existing ballast and rewiring of the fixture with either an external electrical supply or a direct (AC or DC) voltage to the LEDs, via a power supply. Retrofitting a fluorescent lamp fixture requires in most cases the services of an electrician to meet or adhere to local, provincial, state, and/or federal building codes. A direct bulb replacement, i.e.

without the need of a retrofit, of common fluorescent lamps is therefore not possible with existing LED technology.

SUMMARY OF THE APPLICATION

One aspect of the disclosure provides a light emitting diode apparatus for replacement of existing fluorescent lamps used in common fluorescent fixtures, without the need for a retrofit.

There is provided a light emitting diode apparatus for operation with varying input electrical sources. The apparatus comprises an array of light emitting diodes to produce light, and a variable input power supply adapted to provide an electrical supply of predetermined value to the light emitting diodes from a varying electric signal provided by varying input electrical sources.

In one embodiment, the light emitting diode apparatus is for use as a replacement of a fluorescent tube in an existing fluorescent fixture, without making any electrical modifications to the existing fluorescent fixture.

In one embodiment, the apparatus comprises a tubular body having a shape and dimensions similar to that of a fluorescent lamp, an array of light emitting diodes arranged in the tubular body to produce a light substantially replacing a light produced by the fluorescent lamp, and a variable input power supply embedded in the tubular body and adapted to power the array of light emitting diodes from the electrical source provided by the existing fluorescent fixture such that the light emitting diode apparatus is connectable to the existing fluorescent fixture in replacement of the fluorescent lamp.

The light emitting diode apparatus is also able to be powered by conventional AC distribution sources as well as DC voltage sources.

Therefore, in accordance with the present application, there is provided a light emitting diode apparatus for operation with a range of variable input electrical sources producing an input electrical signal, the apparatus comprising: electrical connectors adapted to be connected to a power source; an array of light emitting diodes to produce light; and a variable input power supply adapted to provide an electrical supply of suitable conditions to said at least one light emitting diode by conditioning an electrical signal provided by said variable input electrical sources.

Further in accordance with the present application, the variable input power supply comprises a high speed rectifier for rectifying a frequency of said electrical signal to said suitable conditions.

Still further in accordance with the present application, the variable input power supply comprises a smoothing filter for smoothing pulses of the rectified electrical signal.

Still further in accordance with the present application, there is provided a switch mode boost circuit for increasing a voltage of said electrical supply to said suitable conditions from the rectified electrical signal.

Still further in accordance with the present application, the light emitting diode apparatus is for use as a replacement of an elongated tubular fluorescent lamp in an existing fluorescent fixture, the apparatus further comprising a tubular body having a shape and dimensions at least similar to that of said fluorescent lamp with said electrical connectors being pins, and the variable input power supply is embedded in said tubular body and adapted to power said array of at least one light emitting diode from a varying input electrical source provided by said existing fluorescent fixture.

Still further in accordance with the present application, the variable input power supply comprises a power factor correction circuit.

Still further in accordance with the present application, the array of light emitting diodes is a single series array of light emitting diodes.

Still further in accordance with the present application, THE variable input power supply is adapted to operate from low-frequency or high-frequency sources.

Still further in accordance with the present application, the input power supply is configured to operate within at least one of the load lines of a magnetic ballast, an electronic ballast, a line voltages, and an alternative power supply device.

Still further in accordance with the present application, the apparatus further comprises a detection circuit to verify the connection of the electrical connectors to the variable input electrical sources.

Still further in accordance with the present application, the LED array is in a series configuration.

BRIEF DESCRIPTION OF DRAWINGS

It will be noted that throughout the appended drawings, like features are identified by like reference numerals.

DESCRIPTION OF PREFERRED EMBODIMENTS

Figure 1:
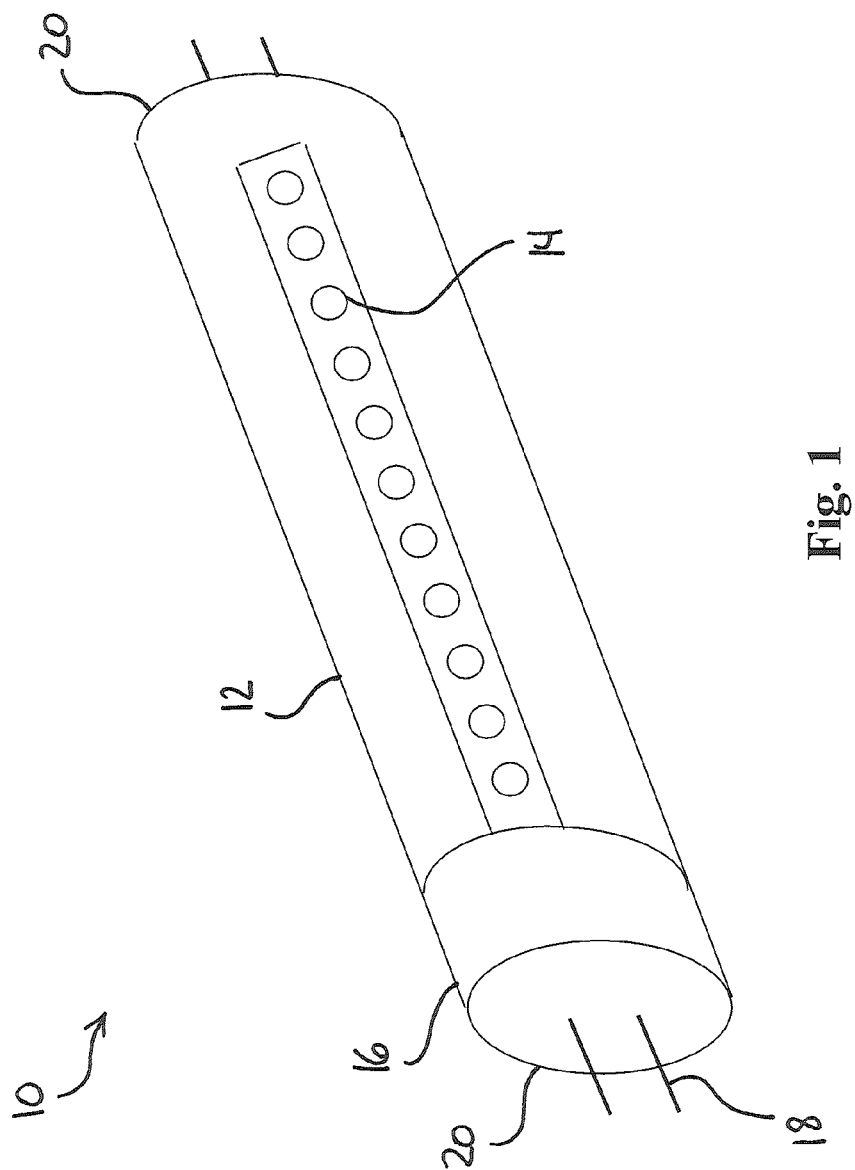
FIG. 1 is a perspective view of a Light Emitting Diode (LED) apparatus in accordance with one embodiment.

Now referring to the drawings, FIG. 1 shows a Light Emitting Diode (LED) apparatus 10 which can be used as a replacement of a fluorescent lamp in existing fluorescent fixtures with ballast. In one embodiment, the LED apparatus 10 comprises a tubular body 12, an array of LEDs 14 typically arranged in a series loading pattern, a Variable Input Power Supply Unit (VI-PSU) 16 and end caps 20 with electrical connectors 18 which are used to make an electrical connection with existing Compact Fluorescent Lamps (CFLs) or Compact Fluorescent Tubes (CFTs) fixtures or any other suitable electrical contact point. In one embodiment, the tubular body 12 has a shape and dimensions substantially corresponding to that of the fluorescent lamp to be replaced. The array of LEDs 14 is arranged in the tubular body 12 to produce a light substantially replacing a light normally produced by fluorescent lamp. The VI-PSU 16 is embedded in the tubular body 12 and provides an electrical source to the LEDs 14 and can operate in a wide range of applications where voltage inputs vary. The VI-PSU 16 may be powered by various types of inputs such as various types of ballasts, external power supplies, direct AC voltages or direct DC voltages. The input electrical connectors 18 on the power supply 16 are adapted to connectively fit to output connectors of a conventional ballast such that the LED apparatus 10 can be connectable to existing fluorescent fixtures in direct replacement of a fluorescent lamp.

In most LED lighting applications, a combination of series and parallel loading is used. In one embodiment, chains of 4 to 40 LEDs, mounted in series, are typically used, which are then grouped together in a number of typically 5 to 70 parallel chains of LEDs, thereby making the loading essentially series-parallel. As LEDs may fail in open circuit mode, a series connection may cause one chain to stop functioning, whereby parallel chains keep on functioning in a series-parallel configuration.

Most commonly used power supplies for LED lighting appliances are designed as constant current power supplies. LEDs require a precise current flow to operate in the power range which permits effective light output and long life span. In a series-parallel configuration an open circuit failure of one LED prevents current from flowing in one of the parallel chains. The remaining parallel chains experience current increases as the power supply is a constant current source. This may increase the power dissipation in the remaining parallel chains, which may shorten the life span of the remaining LEDs.

LEDs can also fail in a closed circuit mode. If this occurs, other diodes in the parallel chains experience increased current flow as all the parallel chains are subjected to the same applied voltage. Individual LEDs typically require a 2.8 to 3.8 V potential, i.e., forward voltage, to initiate conduction. If one LED in the chain fails in closed circuit mode, it conducts at a much lower voltage. This increases the voltage drop across the other LEDs in the chain, which in turn increases the flow of current through that failing parallel chain. This reduces the flow in all other remaining parallel chains, which lowers light levels and can affect the performance of the lamp. The other LEDs in the same chain as the failed LED may also fail closed and this will lead to an appliance failure as all current will short through this path, this occurrence being known as "current hogging".

Open circuit diode failure may primarily be caused by current transients and electrostatic voltage spikes, which destroy the bond wires on the LED die. Semiconductor junctions and LEDs may fail closed if operated under stable constant current at less than maximum rated current.

The VI-PSU 16 is adapted to maintain delivery of the design current value while also preventing current spikes and electrostatic discharge, and monitor and maintain a constant voltage value independently of the current value. In the LED apparatus 10, the LED array 14 is made of a single series array of LEDs which operates at a high voltage and minimum current. In combination with this LED configuration, the VI-PSU 16 is designed to require minimum current flow, maintain identical current in all LEDs, demand minimum current from the switching supply which minimizes thermal loss and electromagnetic interference in the supply, allowing minimum component sizing, enabling the ability to operate at unity power factor, and/or be able to operate with very low total harmonic distortion.

Figure 2:
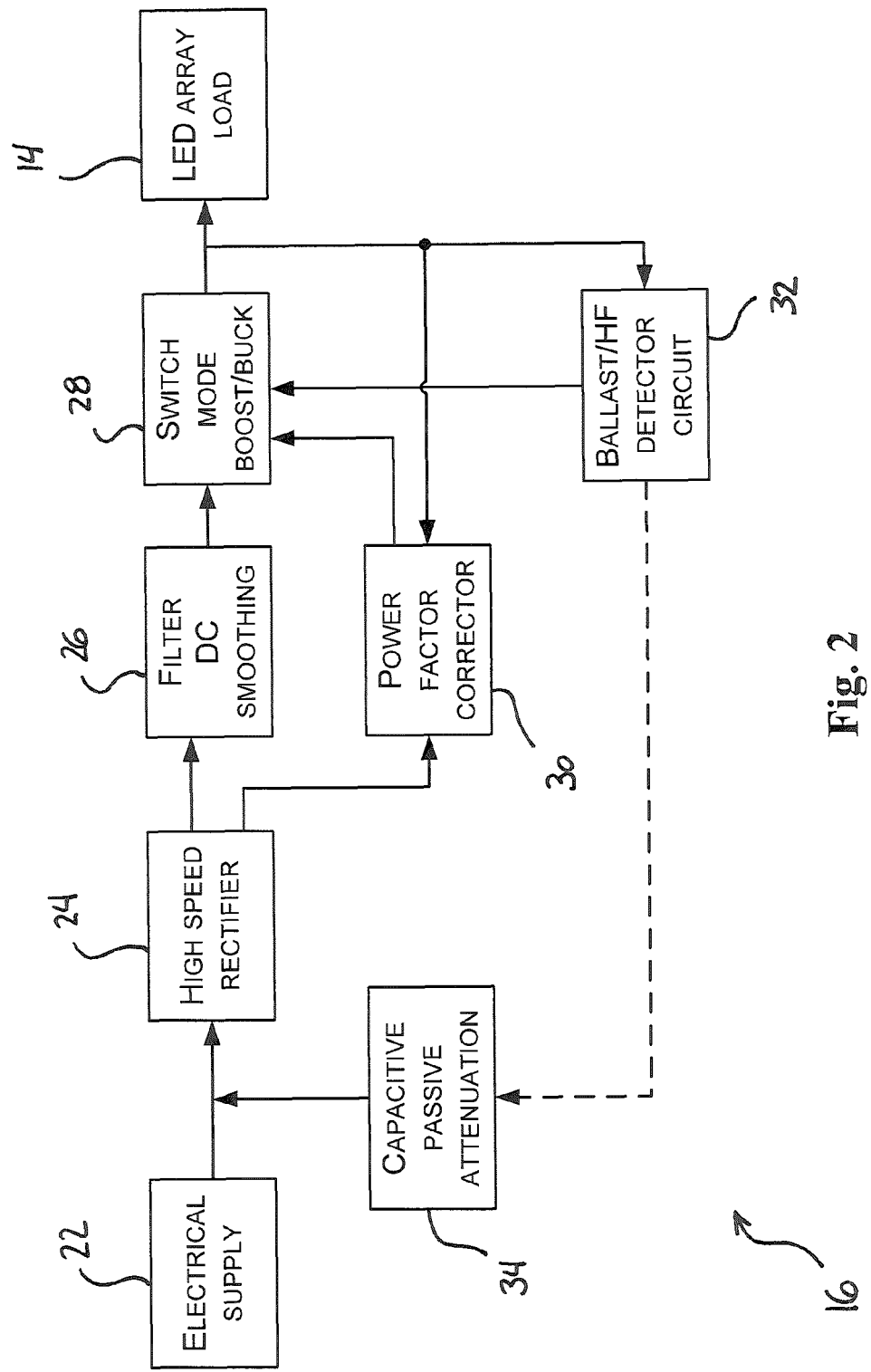
FIG. 2 is a block diagram illustrating a variable input power supply of the LED apparatus of FIG. 1 in accordance with one embodiment.

FIG. 2 illustrates the VI-PSU 16 of the LED apparatus 10. In accordance with one embodiment, the VI-PSU 16 is electrically powered by an external electrical supply 22 connected to the VI-PSU 16 through the electrical connectors 18 (see FIG. 1). The VI-PSU is capable of operating universally to power the LED array 14 from varying input sources, such as input frequencies ranging from 0 Hz (DC) to 200 kHz, for example, and input voltages ranging from 80 VAC to 600 VAC rms or 9 VDC to 600 VDC, for example, sinusoidal or non-sinusoidal. Accordingly, the VI-PSU 16 is capable of operating universally from different types of magnetic or electronic ballast or driver typically used in CFL or CFT technology. The VI-PSU 16 comprises a high speed rectifier 24 including an RF filter, a DC smoothing filter 26, a switch mode boost/buck circuit 28, a power factor corrector circuit 30, an optional ballast/HF detector circuit 32 and a capacitive passive attenuation circuit 34. The VI-PSU 16 of FIG. 2 and described herein is designed to operate with the LED array 14 in a series LED load configuration. This load configuration is designed to minimize current flow and provide equal current to all LEDs of the LED array 14. The series LED load configuration provides the same operating current for each LED.

The high speed rectifier 24 may be used to rectify the high frequency output from an electronic ballast, which may commonly be in excess of 25 kHz. A high speed rectifier 24 allows the VI-PSU 16 to be connected to electronic ballasts used for fluorescent lights, to magnetic ballasts and to conventional AC sources operating at 60 Hz.

According to an embodiment, high speed rectifiers may be composed of diode semiconductor junctions which are designed to have a lower reverse leakage current when operated at high frequency. The majority of rectification applications are at 60 Hz and require common rectifier diodes which are designed to operate at low frequency.

When common low frequency rectifier diodes are used at high frequency, thermal losses occur as the diode cannot recover quickly enough, and some current leaks through the junction in reverse, which can overheat the diode and possibly damage other components. The defining specification for diode speed is the reverse recovery time, which is given in microseconds for low speed rectifiers and in nanoseconds for high speed rectifier diodes.

The DC smoothing filter 26 is used after the high speed rectifier in order to integrate the pulses of rectified voltage to a smooth DC voltage.

The switch mode buck boost filter 28 is intended to provide a boost voltage. In the LED apparatus 10, the LED array 14 is in series and therefore requires in excess of 700V to operate. As voltage sources are usually less than this, a boost is required to increase the voltage. The boost mode is selected as it allows to operate with lower current as the LEDs are in series. Minimum current reduces the size of components and power losses. Minimum current allows the controller to provide the maximum "power factor correction" and minimize the "total harmonic distortion" on the incoming power line. Other LED tubes use LEDs in series and parallel and require greater current flow.

The high frequency detection circuit 32 is used to detect when an electronic ballast is connected, as they operate at high frequency (>25 kHz). This allows the VI-PSU 16 to operate in a mode which is optimum for the power source. The VI-PSU 16 can adopt electronic & magnetic ballasts as a power source, as well as common AC power sources. All of these sources have different voltages and frequencies and other supplies must be connected to one type. The VI-PSU 16 can also accept different waveshapes other than sinusoidal.

The capacitive passive attenuation circuit 34 may be used to reduce the voltage before the input rectifier. A capacitor shunt circuit can be configured to reduce this voltage and not dissipate power (better overall efficiency). The circuit works at selected frequency ranges, e.g., above 25 kHz while being inactive at lower frequencies such as 60 Hz, where voltages from magnetic ballasts and power lines are lower.

It is noted that a common problem with conventional power supplies designed for LED lighting applications is unequal current distribution among the parallel LED loads. Common power supplies typically operate at high electrical currents which result in high thermal losses, low power factor, high total harmonic distortion and high radiated electromagnetic interference noise. The series LED load configuration of the LED array 14 allows for low operating electrical current, which can range from 5 mA to 100 mA for example, depending on the chosen LED, while state-of-the-art power supplies typically use several parallel LED loads, ranging from 4 to 40 parallel loads which often require in excess of hundreds of mA of operating current.

The series LED load configuration also optimizes the lifespan of the LEDs as the operating current is balanced across all LEDs, thus creating better thermal management which is the essence of life preservation when it comes to LED and electrical components in general. Since the VI-PSU 16 provides a constant current and voltage monitoring source for the LED array 14 in series LED load, a balanced current is maintained in all LEDs, which provides for equal power dissipation by all LEDs. This avoids "current hogging" and also helps permit longer lifespan of LEDs.

In typical power supplies and parallel LED load configuration, if one LED burns out, there are two possible outcomes: a) the LED fails open and the remaining LEDs in the series chain go out leaving the other parallel chains in operation; and b) the LED fails closed and the remaining LEDs in the series chain stay operational. In either case, as typical power supplies are tuned to a specific constant current, LEDs start to fail or burn out, whereby the other LEDs in the parallel chain are forced to share the excess current, driving them past their operating current, which creates thermal management problems, which in turn may burn out more LEDs. The VI-PSU 16 operation is different in that if a LED fails closed, the VI-PSU 16 regulates the voltage down with a constant current and maintains the current level across all LEDs as they are all loaded in a series configuration.

In one embodiment, the LED array 14 comprises Zener diodes arranged to provide a bypass current path around groups of several series LEDs. Accordingly, in rare occurrences where a diode fails open connection, due to precisely monitored current control, the Zener diodes allow a bypass of the group of LEDs corresponding to the failed LED and the remaining of the LED array 14 remains operational. This ensures that any open failures, although unlikely when using the VI-PSU 16, will not result in an interruption of current flow. The VI-PSU 16 then maintains constant current output and all remaining diodes receive the same current as in normal operation. In other embodiments, reverse or negative fusing concept may be used instead of Zener diodes.

The LED apparatus 10 comprising the VI-PSU 16 and the series LED array 14 optimizes energy efficiency, power factor, total harmonic distortion and radiated electromagnetic interference noise. It also allows high voltage and low current operation which is achieved by the use of the series LED configuration and the VI-PSU 16 which, in one embodiment, operates in step up voltage, i.e., boost, mode.

In one embodiment, the switch mode boost/buck circuit 28 allows for the VI-PSU 16 to boost/buck any input supply voltage to the operating voltage of the series LED chain. The VI-PSU 16 generally operates in boost mode as the source voltages from direct AC, magnetic ballasts and electronic ballasts are increased to meet the required voltage of the series LED array 14. However, in some applications, bucking may be preferred.

The optional ballast/HF detector circuit 32 allows for the VI-PSU 16 to identify the difference between direct AC voltage sources, magnetic ballast supplies and electronic ballasts. In most cases this circuit is not required but may be required in special cases. This allows the VI-PSU 16 to optimize the power draw from the ballast by implementing the capacitive passive attenuation 34 in order to provide an electrical load which is equivalent to a gas discharge lamp. It is noted that in some cases this mildly or strongly attenuates the incoming voltage but it allows for operation of gas discharge ballast in stable mode with LED lamps.

It is noted that LEDs are non linear in their conduction behavior and present undesirable and small conduction angles to electrical energy sources when driven directly from these sources. This can result in an undesirably low power factor and large harmonic distortion. Electrical utilities require loads which conform to strict standards in this regard. The VI-PSU 16 optimizes the ability to control the conduction angle and the resulting power factor and total harmonic distortion by operating at the lowest possible current flow and boosts the voltage to permit the power factor correction circuit to be used. Low operating current minimizes thermal inefficiency due to $I^2R$ losses in the VI-PSU 16 and LED array 14. Low operating current minimizes the effective current draw from the electrical energy source. This ensures the optimum control of non linear current draw by the LED array load and allows optimum power factor correction. Low operating current minimizes the radiated noise from the power supply. Low operating current minimizes the generation of total harmonic distortion into the electrical source. Low operating current minimizes the size of magnetic components.

The minimal current consumption of the VI-PSU 16 may reduce the need for electrical noise filter elements at all stages of the circuit. Conventional switch mode power supplies for LED applications require series and shunt reactive components at the input of the circuit. These circuit elements are usually configured for 60 Hz operation. Gas discharge lamp ballasts in particular, operate at higher frequencies and are prevented from operating if these filter elements are applied. The VI-PSU 16 may not require significant filtering and permits direct AC, magnetic ballasts and electronic ballasts to operate as energy sources, for example. The VI-PSU 16 may integrate magnetic components into its configuration. This is possible as the size of the magnetic element is small. The low current design of the VI-PSU 16 and the series LED array 14 minimizes the size of the magnetic components in the circuit, thereby reducing cost, increasing thermal efficiency, and reducing space requirements, as the electrical circuit may be fitted in small spaces.

The VI-PSU 16 provides a specific load factor to gas discharge ballasts to maintain an optimum power point for operation of the ballast. In most cases the VI-PSU 16 combined with a gas discharge ballast usually present in existing lighting fixtures has the effect of lowering the overall gas discharge ballast power consumption and heat dissipation as the load is smaller, typically half of its intended size. This in turn generates a higher overall efficiency of the gas discharge ballast than previously obtained when running CFL/CFT type technology. This may prevent the ballast from excessive current output, which could "crash" the ballast output voltage which typically results in an oscillating output, an erroneous wave shape, low output or no output. It provides an electrical emulation of a gas discharge lighting lamps (CFL/CFT technology). This approach enables the VI-PSU 16 to maintain stable operation of gas discharge lamp type ballasts.

When using a typical ballast used to power CFL/CFT lamps, one should consider an additional functionality that is included in the VI-PSU 16. Heater elements are common in almost all CFL/CFT bulbs or lamps. They can consist of a series resistor which is typically housed inside the bulb/lamp. This resistor has two functions: a) it heats up the gas inside the gas tube so that when the tube is operated in a cold environment such as in freezers or outdoors, the heating element can warm up the gas to assist the conduction process, which allows the tube to produce usable light; b) the resistor typically housed at both ends of the CFL/CFT tube/bulb is used as an electrode, anode or cathode, to pass electrical current through the gas allowing it to ignite and produce usable light. Typical ballasts have two wires to each end of a gas tube. The transformer in the ballast has a high voltage winding with a low voltage winding at each of its ends. The high voltage winding is used to drive the electrodes, which drives the gas in the tube to produce light.

Some ballasts provide heating current to the resistance heaters to promote the gas to conduct and reduce electrode burnout. Some ballasts have a starting circuit which engages the resistance heaters and then switches over to the high voltage electrodes for operation. Some ballasts maintain the resistance heaters on at all times.

At least the two following embodiments allow for the LED apparatus 10 to be connected directly into existing fluorescent lamp fixtures with ballasts.

A first embodiment applies to fluorescent lamp fixtures having a two-pin connection to the tube. In this case, one of the two pins should be connected to the VI-PSU 16. The VI-PSU 16 connects a single pin at each end of the tube. Regardless of which pin is connected a connection to the high voltage winding occurs.

A second embodiment applies to both fluorescent lamp fixtures with single-pin or two-pin connections. In this case, a series resistor of equivalent value to that of typical heater elements of fluorescent lamps of a given size is installed in the LED apparatus. This allows the ballast to operate as if there was a heater element in place. In order to work properly, the value of the resistance should be matched according to the typical resistance of the fluorescent tube that is being replaced, as obtained after the heat cycle of the tube. In these conditions, the ballast operates as if the heating cycle was completed. The ballast then operates in its second mode in which it powers the electrical load and therefore powers the VI-PSU 16 of the LED apparatus 10.

In the VI-PSU 16, the high speed rectifier 24 uses diode rectification to derive positive DC voltage from AC sources. The resulting DC voltage is applied to the LED array 14 to achieve light production. Many circuits in use today utilize switch mode power supplies to condition the AC source to a DC source which is appropriate for a LED load. Alternately, in one embodiment, the circuit of FIG. 2 uses a simple method of matching LED array forward voltage characteristics to the DC value of the AC rectified power source, to allow a stable generation of diode light. This requires the LED voltage to be relatively high in order to accommodate the high source voltage. This avoids the complexity and energy losses incurred in switch mode power supplies which provide a voltage reduction from high source voltage to lower operating voltage, which results in higher current flow.

The following features may or may not be incorporated, in combination or not, in embodiments of the LED apparatus 10 and its VI-PSU 16 described herein.

In one embodiment, the series LED array 14 is matched to common wall voltages, e.g., 120 VAC rms or 240 VAC rms. A wall voltage of 120 VAC rms, as commonly used in North America, has a peak voltage of 170 Vpk. If LEDs are placed in series and the diode forward voltages (Vf) are summated to the peak value, then an appropriate and minimum current flow results and stable light output can be achieved. This technique eliminates the need for voltage regulation circuits, transformer circuits or voltage conditioning circuits, thereby simplifying the circuit and reducing power losses, which are common in other LED power supply circuits.

In one embodiment, capacitance is used to provide reactive attenuation of voltage and current in order to avoid using resistors or active elements which have power dissipation losses. This requires the use of a series capacitance, which provides a reactive voltage drop. Reduction of voltage is achieved in most power supplies by the use of series resistance, series transistor or switch mode transistor, which reduces voltage by dissipation of power by means of a resistive voltage drop or switch mode voltage reduction (AC/DC conversion). Series capacitance provides a reactive voltage drop and generally does not dissipate power. This concept may be used in the VI-PSU 16 to provide voltage reduction with minimal power dissipation, which would otherwise be a non-negligible energy loss.

In one embodiment adapted for use with ballasts, a capacitance is used in parallel with the series LED array load. The function of the capacitor is to provide a reactive load to the ballast output transformer, which is specifically designed to saturate when operated with gas discharge tubes. This creates a level of saturation which reduces the voltage to the desired output value for the LED load and does not dissipate energy in doing so.

In one embodiment, a Positive Coefficient of Temperature (PCT) device is uses to provide dynamic control of voltage. In one embodiment, the PCT device is placed in series with the LED array load. The resistance of the PCT device actively increases as the current increases in the LED array load, thereby creating a more constant current control. LED devices have a negative resistance coefficient and when placed in series with a PCT device, which has a positive resistance coefficient, then the opposing characteristics can be tuned to provide a more constant current flow.

The ballast/HF detector circuit 32 detects whether direct VAC or/and ballasted sources are used. Ballasted sources vary in frequency and amplitude depending on the make and model; therefore conditioning of the source voltage has to occur to operate a LED load. Ballasted sources are designed with a saturating output transformer which is needed to achieve an operating voltage into gas discharge lamps. Transformer outputs are "floating" sources as the voltage developed is the potential difference of the secondary winding. An AC source from a common wall plug has a neutral wire which is the zero volt reference and is commonly referenced to earth ground potential. The AC source has a voltage which swings positive and negative with respect to the neutral potential. Accordingly, in one embodiment, a DC bias voltage is applied to the output of the ballast source. This biases the ballast output voltage so that the AC swing falls below the zero volt potential. This allows the circuit to discriminate between an AC wall voltage and a ballasted source. If a diode is used as a detector, then the AC source generates a positive voltage as there is a voltage swing above the zero volt reference. If the ballast source is applied to the diode detector, then no positive voltage occurs and the ballast source has an AC voltage swing which is below the zero reference, due to the DC bias voltage applied in the proposed circuit. Ballast circuits will operate at much higher voltages than AC wall sources, when applied to a LED load. The proposed ballast/HF detector circuit 32 detects the difference between the sources and applies a series capacitor, referred to as the capacitive passive attenuation circuit 34, to the ballast source output, thereby dropping the voltage to an appropriate level.

The VI-PSU 16 is described herein in the context of operating with a series LED load configuration but it should be understood that other LED configurations are also possible.

Also, in the embodiments described herein the VI-PSU 16 is used in a LED apparatus 10 resembling a fluorescent lamp in order to be used as a replacement for such a lamp in fluorescent lamp fixtures. It should however be understood that the VI-PSU 16 described herein is not limited to such use and that it can be used to power all kinds of LED arrays designed to replace light sources such as HID, halogens, mercury vapor, metal halide, etc.

Conventional fluorescent lamps and fixtures have electrical safety requirements which require that an electrical shock hazard is not present when a person is installing a lamp into a fixture which is electrically energized. If one end of the lamp is connected to the ballast while the person makes contact with the electrical contacts at the opposing end of the tube, then the possibility of electrical shock injury exists.

The VI-PSU 16 may be equipped with a detection circuit which prevents the activation of the power supply control circuit. In order for the VI-PSU 16 to operate, it must detect equal voltages on all four connection pins, which is what occurs when it is correctly connected to electronic ballasts, magnetic ballasts and conventional AC sources. If any pins are not inserted into the fixture lamp connectors, the VI-PSU will not start. This prevents electrical shock from exposure to pins which are not connected correctly.

Now that the various components of the LED apparatus 10, the operation of the VI-PSU 16 is set forth.

The electrical source may be any appropriate power source to which the LED apparatus 10 will be connected. Accordingly, the electrical signal may be in a wide range of conditions. For example, an AC source produces an electrical signal ranging between 80 VAC-347 VAC, at 50-60 Hz. In some instances, the frequency can go as high as 400 Hz (e.g., aircraft applications). An electronic ballast source produces an electrical signal of 1000 Vpp-2000 Vpp, with frequencies ranging between 25 kHz-2000 kHz. A magnetic ballast source is at 800 Vpp-1500 Vpp, with a range of 50-60 Hz. As yet another example, a DC source is between 100 Vdc-700 Vdc.

The capacitive shunt filter attenuates the high frequency when required, for instance from electronic ballasts, without power loss.

The high speed rectifier rectifies the frequency. In an embodiment, the VI-PSU 16 performs 60 ns rectification. If the input electrical signal is AC, the high speed rectifier 24 will convert it to DC.

The common mode filtering and inductive filtering then attenuates noise products from propagating from the internal circuit back into the external power line. The pulse DC voltage at this point can be 160 Vpk from common 120 VAC sources to 600 Vpk from electronic ballasts. There is not a lot of capacitor smoothing at this point as the switch mode controller will provide pulse mode action across each DC pulse in order to provide equal current draw across the waveform and from the source.

The controller circuit manages the smooth and constant current draw from the AC source (power factor correction). It also ensures low harmonic distortion of the current draw from the power line. It also is configured to precisely control the current to the LEDs (15-20 mA), regardless of the outside applied voltage.

A detector circuit senses the difference between 60 Hz and high frequency and alters the voltage feedback loop to control high voltages from electronic supplies.

The safety detection circuit ensures that all four pins are connected to the applied voltage. If the pins are correct the detection circuit enables the controller circuit to start. A thermal shutoff circuit will turn off the tube if excess heat is developed.

The switch mode output transistor and custom transformer provides a pulse mode action to boost the incoming voltage to the required 740 Vdc for the series LED array.

The high speed rectification of pulse mode transistor and transformer creates high voltage DC. 30 ns diodes are required in this position.

Smoothing capacitors provide smooth DC to the LEDs, which provides constant, non-flicker light.

The electrical supply is then provided to the LED array. In an embodiment, the LED array features as many as 250 LEDs in series with zener diodes which only become active when a LED fails.

The embodiments described above are intended to be exemplary only. The scope of the invention is therefore intended to be limited solely by the appended claims.

The invention claimed is:

1. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light; and
   a variable input power supply adapted to provide an electrical supply of suitable conditions to said array of light emitting diodes by conditioning the electrical signal of a connected one of said variable input electrical sources;
   wherein said input power supply is configured to operate within at least one of the load lines of a magnetic ballast, an electronic ballast, a line voltages, and an alternative power supply device.

2. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources; and
   a detection circuit to verify the connection of the electrical connectors to the connected one of the variable input electrical sources.

3. The light emitting diode apparatus as claimed in claim 2, wherein operation of the variable output power supply is permitted only upon detecting that the electrical connectors are correctly connected.

4. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources;
   wherein said light emitting diode apparatus is for use as a replacement of an elongated tubular fluorescent lamp in an existing fluorescent fixture;
   wherein said apparatus further comprises a tubular body having a shape and dimensions at least similar to that of said fluorescent lamp with said electrical connectors being pins;
   wherein said variable input power supply is embedded in said tubular body and adapted to power said array of at least one light emitting diode from a varying input electrical source provided by said existing fluorescent fixture; and
   further comprising detection circuit to verify the connection of the electrical pins to the variable input electrical sources and allowing operation of the variable output power supply only if the electrical pins are determined to be correctly connected.

5. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources; and
   a high frequency detection circuit to detect the presence of an electronic ballast upon detection of a high frequency.

6. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources; and
   a floating source detector to determine whether the connected variable output electrical source is an AC wall voltage or a ballasted source.

7. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources; and
   a detector circuit which senses between 60 Hz and high frequency and alters a voltage feedback loop of the variable input power supply accordingly.

8. A light emitting diode apparatus for operation with a range of variable input electrical sources producing an input electrical signal, the apparatus comprising:
   electrical connectors adapted to be connected to any one of the variable input electrical sources and receive the input electrical signal therefrom;
   an array of light emitting diodes to produce light;
   a variable input power supply adapted to provide an electrical supply of suitable conditions to said array of light emitting diodes by conditioning the electrical signal of a connected one of said variable input electrical sources; and a detector circuit which detects whether the electrical source is a direct VAC source, and a conditioner which operates to condition the electrical source upon determining that the electrical source is a direct VAC source.

9. A light emitting diode apparatus for operation with a range of variable input electrical sources producing an input electrical signal, the apparatus comprising:

electrical connectors adapted to be connected to any one of the variable input electrical sources and receive the input electrical signal therefrom;

an array of light emitting diodes to produce light;

a variable input power supply adapted to provide an electrical supply of suitable conditions to said array of light emitting diodes by conditioning the electrical signal of a connected one of said variable input electrical sources; and a switch mode boost/buck circuit for selectively boosting or bucking a voltage of said electrical supply to said suitable conditions.

10. A light emitting diode apparatus for operation with a range of variable input electrical sources producing an input electrical signal, the apparatus comprising:

electrical connectors adapted to be connected to any one of the variable input electrical sources and receive the input electrical signal therefrom;

an array of light emitting diodes to produce light;

a variable input power supply adapted to provide an electrical supply of suitable conditions to said array of light emitting diodes by conditioning the electrical signal of a connected one of said variable input electrical sources;

wherein said variable input power supply comprises a high speed rectifier for rectifying a frequency of said electrical signal to said suitable conditions; and further comprising a switch mode boost/buck circuit for selectively boosting or bucking a voltage of said electrical supply from the rectified electrical signal to said suitable conditions.

11. A light emitting diode apparatus for operation with a range of variable input electrical sources producing an input electrical signal, the apparatus comprising:

electrical connectors adapted to be connected to any one of the variable input electrical sources and receive the input electrical signal therefrom;

an array of light emitting diodes to produce light;

a variable input power supply adapted to provide an electrical supply of suitable conditions to said array of light emitting diodes by conditioning the electrical signal of a connected one of said variable input electrical sources;

wherein said LED array has a plurality of LEDs in a series configuration; and further comprising at least one bypass current path around a corresponding group of LEDs in the series configuration for the series configuration to remain operational in the event of a LED within the corresponding group failing in open connection.

12. The light emitting diode apparatus as claimed in claim 11 wherein the bypass current path has at least one of a zener diode, a reverse fusing concept and a negative fusing concept.

* * * * *